(12) United States Patent
Powell et al.

(10) Patent No.: US 7,623,068 B2
(45) Date of Patent: Nov. 24, 2009

(54) DETECTION OF DECEPTION SIGNAL USED TO DECEIVE GEOLOCATION RECEIVER OF A SATELLITE NAVIGATION SYSTEM

(75) Inventors: Luke Stephen Powell, San Antonio, TX (US); Thomas Howard Jaeckle, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 248 days.

(21) Appl. No.: 11/749,603

(22) Filed: May 16, 2007

(65) Prior Publication Data

US 2008/0169978 A1    Jul. 17, 2008

Related U.S. Application Data

(60) Provisional application No. 60/747,334, filed on May 16, 2006.

(51) Int. Cl.
*G01S 1/02* (2006.01)
(52) U.S. Cl. .............................. 342/357.12; 342/357.06; 342/357.13

(58) Field of Classification Search ............ 342/357.02, 342/357.06, 357.12, 357.13, 357.15; 701/213, 701/215
See application file for complete search history.

(56) References Cited

U.S. PATENT DOCUMENTS

| 5,134,407 A | 7/1992 | Lorenz et al. ................ 342/352 |
| 5,640,452 A | 6/1997 | Murphy ......................... 380/5 |
| 6,396,432 B2 | 5/2002 | Riemschneider et al. ...... 342/15 |
| 6,686,877 B2 | 2/2004 | Ishigaki et al. ......... 342/357.12 |

FOREIGN PATENT DOCUMENTS

JP    14116245 A    4/2002

OTHER PUBLICATIONS

International Preliminary Report on Patentability, PCT/US2007/069043, 6 pages, Nov. 27, 2008.
International Search Report and Written Opinion PCT/US2007/069043, 10 pages, Mar. 12, 2008.

*Primary Examiner*—Dao L Phan
(74) *Attorney, Agent, or Firm*—Baker Botts L.L.P.

(57) ABSTRACT

A method for detecting the presence of a deception signal associated with a satellite navigation system. The deception signal has certain "observables", which can be used by a GPS receiver to detect the presence of the deception signal.

15 Claims, 1 Drawing Sheet

DETECTION OF DECEPTION SIGNAL USED TO DECEIVE GEOLOCATION RECEIVER OF A SATELLITE NAVIGATION SYSTEM

RELATED PATENT APPLICATION

This application claims the benefit of U.S. Provisional Application No. 60/747,334, filed May 16, 2006 and entitled "DETECTION OF DECEPTION SIGNAL USED TO DECEIVE GEOLOCATION RECEIVER OF A SATELLITE NAVIGATION SYSTEM."

GOVERNMENT LICENSE RIGHTS

The U.S. Government has a paid-up license in this invention and the right in certain circumstances to require the patent owner to license others on reasonable terms as provided for by the terms of Contract No. 03-C-4568 for the United States Navy.

TECHNICAL FIELD OF THE INVENTION

This invention relates to satellite navigation systems (SNS's), and more particularly, to a SNS receiver that detects the presence of a deception signal.

BACKGROUND OF THE INVENTION

Satellite navigation systems (SNS's) allow small electronic devices to determine their location (longitude, latitude, and altitude) in within a few meters using time signals transmitted along a line of sight by radio from satellites. One example of a satellite navigation system is the Global Positioning System (GPS). Several other SNS's have been or are being developed, such as the Glonass (Russia) and Galileo (Europe) satellite navigation systems.

SNS's have three parts: the space segment, the user segment, and the control segment. The space segment consists of a number of satellites, each in its own orbit above the Earth. The user segment consists of small receivers, which can be hand-carried or installed on vehicles, such as aircraft, ships, tanks, submarines, cars, and trucks.

The control segment consists of ground stations that make sure the satellites are working properly.

In operation, SNS satellites each broadcast a signal that contains the orbital parameters of the satellite and a means of determining the precise time the signal was transmitted. The position of the satellite is transmitted in a data message that is superimposed on a code that serves as a timing reference. The satellite uses an atomic clock to maintain synchronization of all the satellites in the constellation. An SNS receiver compares the time of broadcast encoded in the transmission with the time of reception measured by an internal clock, thereby measuring the time-of-flight to the satellite. Several such measurements can be made at the same time to different satellites, allowing a continual fix to be generated in real time.

Location detection is not always welcome, and there are situations in which it may be desired to deceive a satellite navigation receiver. U.S. Pat. No. 6,396,432 B2, entitled "Method and Apparatus for the Deception of Satellite Navigation" describes one such method.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
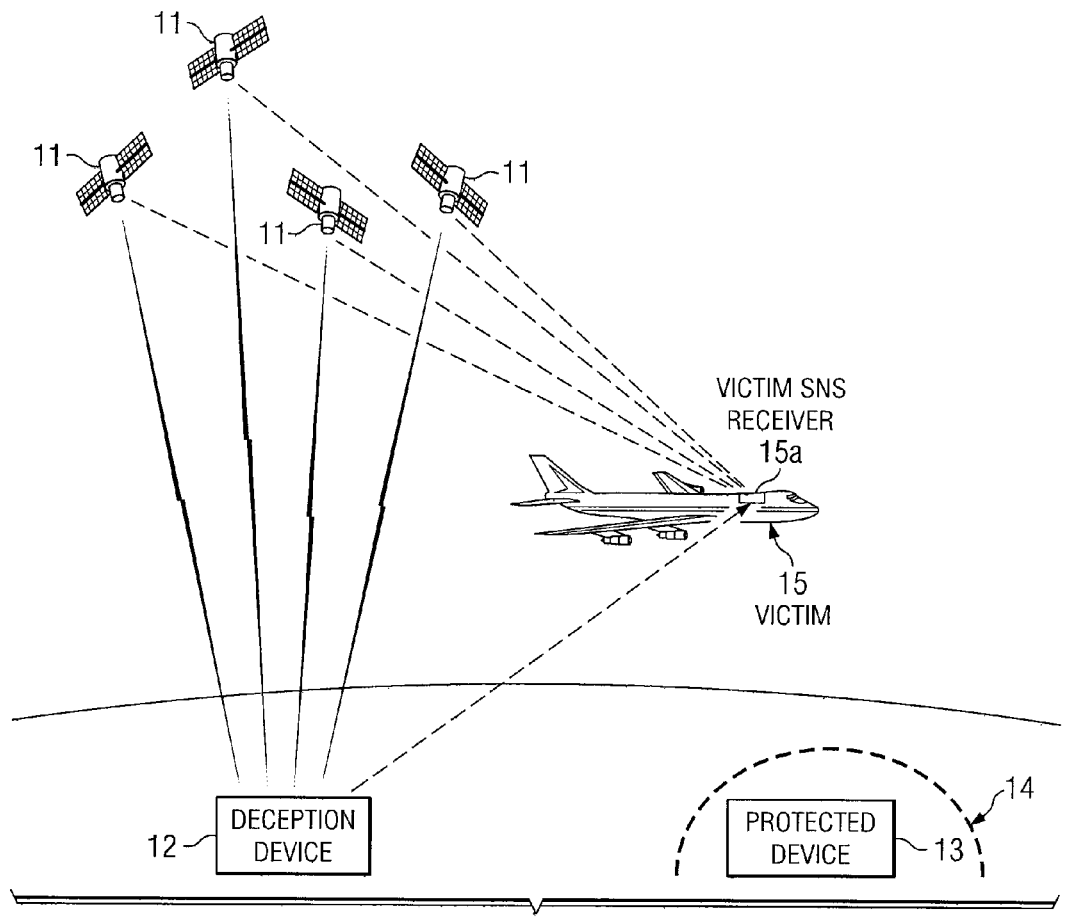
FIG. 1 illustrates a deception signal being used in a satellite navigation system.

FIG. 1 illustrates a satellite navigation system (SNS) deception scheme, and is the context of the present invention. As explained below, the invention is directed to a "victim" SNS receiver 15a, which is deceived into incorrectly reporting its own location.

A satellite navigation system has satellites 11, which transmit navigation signals visible to a deception device 12. Deception device 12 receives these signals and transmits them to a protected three-dimensional area 14 surrounding the protected device 13.

A victim 15 attempting geolocation in the area of protected device 13 has a navigation receiver 15a, which is deceived into detecting the location of deception device 12, or depending upon the scheme used, some other location. In other words, the victim 15 detects the location of the deception device 12 rather than the location of the protected device 13. The protected device might be an arsenal, bridge, or other strategically significant structure or equipment.

An example of an SNS deception system of this type is described in U.S. Pat. No. 6,396,432, referenced in the Background. A satellite antenna (such as one used by deception device 12) receives satellite signals. These satellite signals are amplified and re-transmitted to an area (at device 13) in which the deception is intended. Because the deception signal is amplified, it is incident on the victim receiver 15a with a slight power advantage over the signals directly from the satellites 11. The effect of the deception signal is to cause the victim's receiver to report an incorrect location.

The effect of this method is particularly insidious because a conventional navigation receiver, such as the receiver 15a aboard victim 15, is unable to detect that the deception is occurring. Although an operator observing the computed (false) position of the receiver may be able to detect that the computed position, heading or speed is inconsistent with the receiver's dynamics, this approach to detection is unreliable.

There are variants of the SNS deception scheme of FIG. 1. In a first variant, the deception device 12 receives and then transmits the entire SNS satellite constellation. This is accomplished by the use of an antenna with an omni-directional pattern. A disadvantage of this method is that the incorrect position reported is that of the receive antenna of the deception device. Also, this method is detectable because the victim receiver 15a will report zero speed, even if it is obviously moving (assuming a stationary receive antenna on the deception device 12). Once the deception is detected, direct action can be taken against the deception device 12 because its location (i.e., the position reported by receiver 15a) is known.

In a second variant of the deception scheme, the deception device 12 transmits only a portion of the sky, perhaps one octant. This technique protects the location of the deception device 12 while still providing a deception signal.

In a third variant of the SNS deception scheme, two or more antennas and receivers 12 are used. Each antenna covers the entire sky and the signals from these antennas are combined in a summing amplifier. The composite signal has signals from each antenna available for the victim receiver 15a to choose from. However, any combination of signals from any of these antennas will result in an incorrect solution. The victim receiver 15a typically computes position solutions that are wrong and jump from moment to moment, sometimes a great distance.

The method described herein is intended to provide the victim's navigation receiver 15a with a means of detecting an SNS deception signal. It uses an algorithmic means to enable the navigation receiver 15a to continually test the integrity of its computed location. If the deception device signal can be detected, its deleterious effects can be reduced. For purposes of this description, it is assumed that the deception signal is a repeated signal, that is, it is transmitted more than once.

For purposes of this description, the navigation system is described in terms of the GPS system, which has 24 satellites tracked by a world-wide network of monitor stations. The tracking data is sent to a master control station that continuously updates position and clock estimates for each satellite. The updated data is then uplinked to the satellite via one of several ground antennas. Each GPS satellite takes 12 hours to orbit the Earth. Each satellite is equipped with an accurate clock to let it broadcast signals coupled with a precise time message. A GPS receiver receives the satellite signal, which takes a measurable amount of time to reach the receiver. The difference between the time the signal is sent and the time it is received, multiplied by the speed of light, enables the GPS receiver to calculate the distance to the satellite. To measure precise latitude, longitude, and altitude, the GPS receiver measures the time it took for the signals from four separate satellites to arrive.

Various "observables" are present in the deception signal. Receiver 15a can be programmed to measure certain features of the deception signal and use them to detect the deception signal. Receiver 15a can be implemented with appropriate processing devices, memory, other hardware and software to implement any one or some combination of the methods described below.

Figure 2:
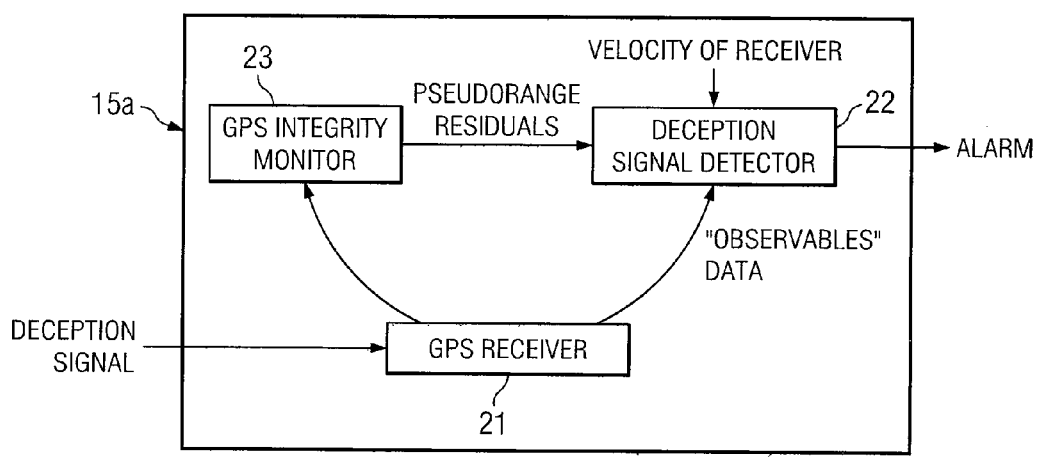
FIG. 2 illustrates the receiver of FIG. 1 in further detail.

FIG. 2 illustrates receiver 15a in further detail. Receiver 15a comprises both conventional GPS receiver circuitry 21 and a deception signal detector 22. Detector 22 is typically implemented in software within one or more microprocessors or other controllers. However, implementation with other circuitry is also possible. In general, a reference to a particular process for detecting deception device 12 represents the programming detector 22 as used to implement the function. As explained below, detector 22 also has memory so that stored values can be monitored and compared to predetermined threshold values or other calculated comparison values.

One observable that can be used to reveal the deception signal is an offset between the local time (as measured by the clock of the victim receiver 15a) and GPS time. When a deception device signal is present, it causes an increased delay in the offset between the local clock (the clock of the victim receiver 15a) and GPS time. A typical GPS receiver, such as receiver 15a, outputs the number of nanoseconds between its clock and GPS time. The rate of change of this quantity is also reported. Detector 22 is programmed to time stamp each location fix, observe the local clock offset when the receiver 15a is navigating, and save these data to memory.

When GPS receiver 15a is navigating, the clock offset is compared to the value stored in memory. The difference is compared to the drift rate to determine if a step increment has occurred. If the offset is greater than the previous offset by an amount more than a predetermined or calculated amount, the presence of a deception signal can be assumed.

In other words, if a true navigation signal is being received, the time offsets will follow a smooth progression. Processing unit 21 detects a deception signal by looking for abrupt changes in the time offsets. These abrupt changes are unidirectional, and always indicate additional delay because the distance the GPS signal must travel via the deception device is always greater than the distance the GPS signal travels directly to the receiver 15a.

Because the presence of a repeater can only delay the signal, the difference between the local clock offset and GPS time will increase by an amount equal to the range between the repeater's transmit antenna and the victim's GPS receive antenna plus the deception device's group delay. This is not to suggest that the receiver's local clock is always behind GPS time, but that the shift due to the deception device will always be in the direction of additional delay.

Another useful observable is a set of pseudorange residuals. As explained above, a GPS receiver uses a pseudorange measurement from at least four satellites along with satellite position information broadcast by the satellites to determine the receiver's location.

As part of an integrity monitoring process, GPS receivers report the difference between a predicted pseudorange to each satellite and the observed pseudorange. The implementation of this monitoring process is performed by monitor 23. Each difference is referred to as a "pseudorange residual". When a GPS receiver is navigating with true satellite signals, its pseudorange residuals are typically less than 100 meters. When a mixture of satellite signals and repeated signals are used to compute a fix, the pseudorange residuals will be much greater.

The inclusion of even a single satellite signal from the deception device 12 will cause the pseudorange residuals to significantly increase. Detector 22 continuously monitors pseudorange residuals and compares their magnitudes to a threshold of approximately 100 meters. If a pseudorange of greater than 100 meters is observed, the repeater threat can be assumed. The pseudorange residual values for the deception device signals will typically be on the order of hundreds to thousands of meters.

In like manner, detector 15a can be programmed to compute Doppler residuals by comparing the predicted Doppler shift of the GPS spacecraft signals for the computed position to the measured Doppler shift. For receivers that are navigating with legitimate satellite signals, the measured Doppler residuals will closely match the predicted Doppler residuals. However, if signals from the deception device 12 are being used for navigation, the Doppler residuals will be composed of the actual satellite Doppler plus the relative Doppler shift between the victim's receiver and the deception device's transmitter. This second component is small compared to the satellite Doppler, but will be equal on all satellites signals coming from the deception device. This technique will require knowledge of the velocity of the receiver in order to compute the expected Doppler shift.

There are other observables that provide information on the presence of a deception signal. By saving the current location and a time stamp to the receiver memory, along with each last velocity, the distance between the current location and the previously stored time stamped location can be divided by the time since the last fix. This will give an indication of the velocity required to travel from the stored fix to the current fix. Performing this calculation when receiver 15a is receiving a deception signal may yield a speed which is not physically possible. The actual speed computed will depend upon the length of time since the previous fix was stored and the current fix and the specifics of the deception device.

In experimentation, signals from a deception device produced nearly instantaneous velocity and direction changes of kilometers per second on a vehicular mounted receiver. This computed velocity can also be compared to the velocity which is available as an observable within the receiver. The deception device 12 will typically cause the receiver's computed velocity to significantly disagree with the velocity computed by differencing the successive fixes and fix times.

From the foregoing, it is clear that there are at least four "observables" that can be calculated and monitored to detect a deception signal. These observables are: time offsets, pseudorange residuals, Doppler residuals, and velocity of the receiver.

Detector 22 receives data from receiver 21 or integrity monitor 23, which it uses to calculate, store, and compare in accordance with the above techniques. If a deception signal is detector, detector 22 generates an alarm or other appropriate data. Although the detector 22 of FIG. 2 is illustrated as receiving input data that will enable it to perform all of the above-described detection methods, it should be understood that detector 22 could be programmed to implement any one or more of these methods.

What is claimed is:

1. A method of detecting a deception signal associated with a satellite navigation system, comprising:
    receiving the deception signal with a receiver normally used for the satellite navigation system;
    calculating at least type of observable data from data provided by the deception signal and data provided by the receiver;
    wherein the observable is at least one type of observable data from the group of: time offsets, pseudorange residuals, Doppler residuals, and velocity of the receiver calculated from the deception signal;
    storing a consecutive series of observable values; and
    monitoring the stored observable values to determine if there is an abrupt change in the observable values.

2. The method of claim 1, wherein the satellite navigation system is a GPS system.

3. A method of detecting a deception signal associated with a satellite navigation system, comprising:
    receiving the deception signal with a receiver normally used for the satellite navigation system;
    calculating time offsets between the time provided by the deception signal and the local time of the receiver;
    storing a consecutive series of time offset values; and
    monitoring the stored offset values to determine if there is an abrupt change in the offset values.

4. The method of claim 3, wherein the satellite navigation system is a GPS system.

5. The method of claim 3, further comprising the step of determining whether the change is in the direction of additional time delay.

6. A method of detecting a deception signal associated with a satellite navigation system, comprising:
    receiving the deception signal with a receiver normally used for the satellite navigation system;
    calculating the pseudorange residuals;
    storing a consecutive series of pseudorange residual values; and
    monitoring the stored pseudorange residual values to determine if there is an abrupt change in the values.

7. The method of claim 6, wherein the satellite navigation system is a GPS system.

8. The method of claim 6, further comprising the step of determining whether the change exceeds a predetermined threshold value.

9. A method of detecting a deception signal associated with a satellite navigation system, using a mobile receiver, comprising:
    receiving the deception signal with a receiver normally used for the satellite navigation system;
    determining the velocity of the receiver;
    calculating the Doppler residuals associated with the deception signal and the receiver;
    storing a consecutive series of Doppler residual values; and
    monitoring the Doppler residual values to determine if there is an abrupt change in the values.

10. The method of claim 9, wherein the satellite navigation system is a GPS system.

11. The method of claim 9, further comprising the step of determining whether the change exceeds a predetermined threshold value.

12. A method of detecting a deception signal associated with a satellite navigation system, using a mobile receiver, comprising:
    receiving the deception signal with a receiver normally used for the satellite navigation system;
    calculating a velocity of the receiver from a previous location and a current location as determined from the deception signal;
    storing a series of velocity values; and
    monitoring the velocity values to determine if there is an abrupt change in the values.

13. The method of claim 12, wherein the satellite navigation system is a GPS system.

14. The method of claim 12, further comprising the step of determining whether the change exceeds a predetermined threshold value.

15. A detector for detecting a deception signal associated with a satellite navigation system, comprising:
    a processor programmed to receive data in the deception signal from a receiver normally used for the satellite navigation system;
    to calculate at least type of observable data from data provided by the deception signal and data provided by the receiver;
    wherein the observable is at least one type of observable data from the group of: time offsets, pseudorange residuals, Doppler residuals, and velocity of the receiver calculated from the deception signal;
    memory for storing a consecutive series of observable values; and
    wherein the processor is further programmed to monitor the stored observable values to determine if there is an abrupt change in the observable values.

* * * * *